SIGNAL AMPLITUDE DISCRIMINATORY CIRCUIT
Filed April 19, 1956
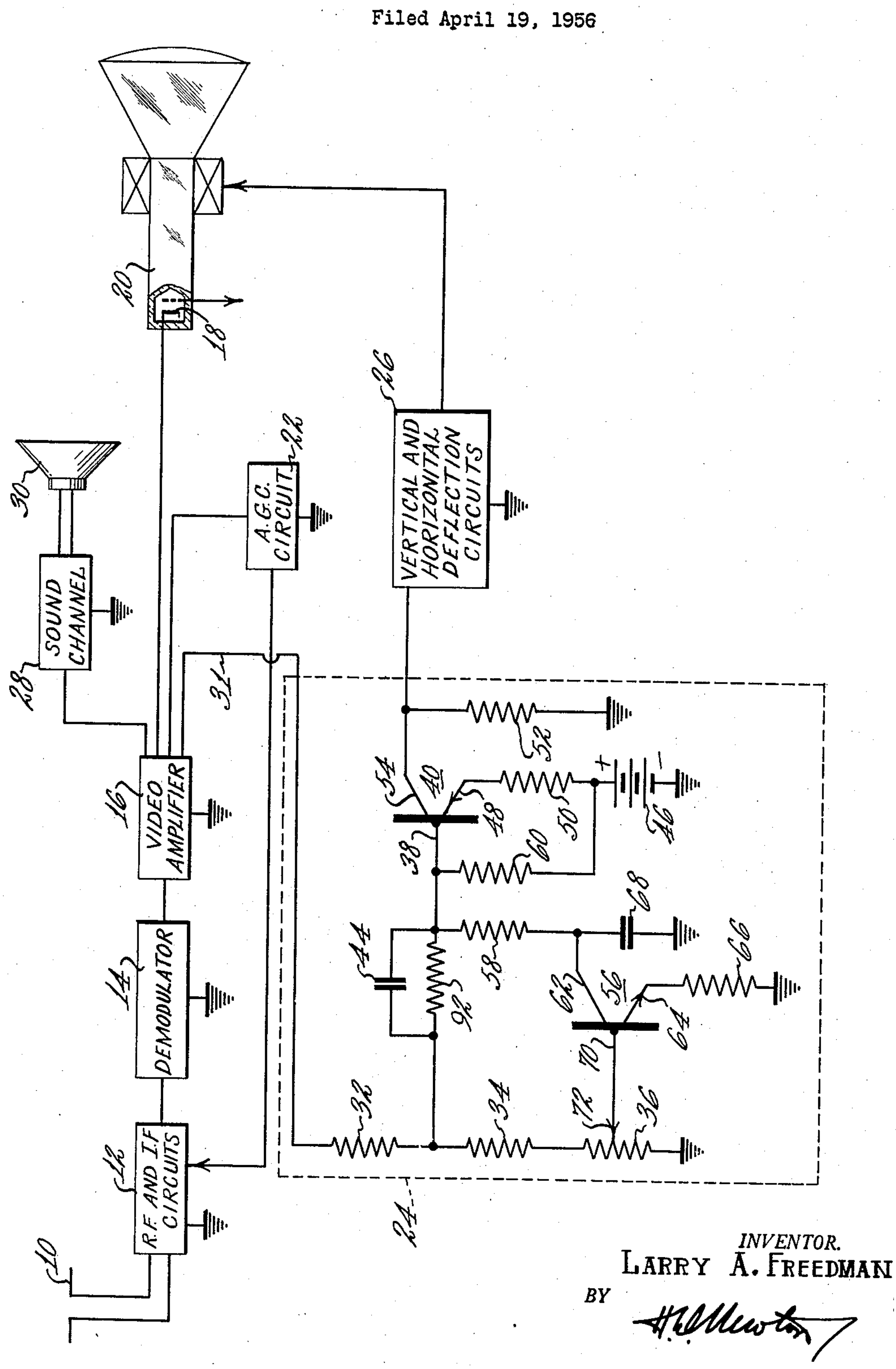
INVENTOR.
LARRY A. FREEDMAN
BY
H. W. Newton
ATTORNEY

United States Patent Office 2,913,523

Patented Nov. 17, 1959

2,913,523

SIGNAL AMPLITUDE DISCRIMINATORY CIRCUIT

Larry A. Freedman, New Brunswick, N.J., assignor to Radio Corporation of America, a corporation of Delaware Application April 19, 1956, Serial No. 579,382

11 Claims. (Cl. 178—7.3)

This invention relates to signal amplitude discriminatory circuits, and in particular to transistor circuits that may be utilized for separating synchronizing signal information from composite television signals and the like.

Electrical circuits may require means for separating a predetermined range of signal information from a given alternating current signal. The predetermined range may be separated by translating only that portion of the signal that is in excess of a predetermined minimum threshold and by limiting the maximum level of signal that may be translated. Transistors may be advantageously utilized in such circuits. However, such alternating current signals, a composite television signal as an example, may frequently vary greatly in amplitude, thus requiring adjustment of the threshold or limiting levels of the circuit in order to prevent transmission of unwanted portions of the signal. In a television receiver it is also desirable to apply, as nearly as possible, constant amplitude synchronizing information to the deflection circuits under varying degrees of strength of the received signal. Thus the threshold and limiting levels of a circuit for separating the synchronizing signal information from a composite television signal should be automatically adjusted in accordance with the strength of the received signal in order to provide more nearly constant-amplitude synchronizing signals and to prevent video information or extraneous noises from adversely affecting the synchronizing signals applied to the deflecting circuits of the television receiver.

It is therefore an object of this invention to provide an improved transistor signal amplitude discriminatory circuit for translating only a predetermined amplitude range of an applied signal, and in which the levels of the predetermined range are automatically controllable to accommodate signals of varying amplitude.

It is another object of this invention to provide an improved transistor synchronizing signal separator circuit for a television receiver which is automatically controllable as to the input signal levels between which a selected portion of the composite television signal is translated.

It is a further object of the invention to provide an improved circuit uitlizing transistors for separating the synchronizing signal information from a composite television signal to provide a substantially constant output signal level under conditons of variation in input signal level.

These and other objects and advantages of the invention are achieved, in general, by providing a transistor signal translating circuit self-biased to clip or prevent translation of input signals below a minimum threshold level and to cut off output current through the transistor on input signals above a maximum value. An additional variable bias responsive to the strength of the input signal is provided to prevent undue changes in the bias level that would allow translation of unwanted portions of the input signal.

However, the invention will be better understood from the following description when read in connection with the accompanying drawing, the single figure of which is a schematic circuit diagram of a television receiver having a signal amplitude discriminatory circuit for a synchronizing signal separator embodying the invention.

Referring now to the drawing, signals are received by an antenna 10 and applied to the television receiver RF and IF circuits 12 which may include the usual tuning means, radio frequency amplifier, mixer, and intermediate frequency amplifier. The received signal from the RF and IF circuits 12 is applied to a demodulator 14 where the signal is detected and supplied to a video signal amplifier 16, which amplifies the detected signal and applies it to the cathode 18 of a kinescope 20. Signals for an automatic gain control circuit 22, a synchronizing signal separator circuit 24, and the vertical and horizontal deflection circuits 26 are also supplied by the video amplifier 16, as will be more fully explained hereinafter.

As is known, the amplitude modulated video and frequency modulated sound carriers of transmitted television signals are separated by 4.5 megacycles, in accordance with present practice. This separation remains when the received television signal is heterodyned by a mixer to an intermediate frequency signal. The demodulator 14 detects the amplitude modulated video signal and at the same time heterodynes the amplitude modulated video carrier and the frequency modulated sound carrier to produce a frequency modulated sound intercarrier having a center frequency of 4.5 megacycles. The sound intercarrier is translated through the video amplifier 16 and applied to the sound channel of the television receiver where it is amplified, demodulated, and applied to a sound reproducing loud-speaker 30.

The automatic gain control circuit 22 may be of any type and is supplied wtih the detected video signal from the video amplifier 16. The automatic gain control circuit 22 develops a direct voltage proportional to the strength of the video signal to control the gain of selected portions of the RF and IF circuits 12 of the television receiver.

The video signal from the video amplifier 16 is also applied to the synchronizing signal separator 24 which separates the synchronizing information from the composite video signal and supplies this information to the horizontal and vertical deflection circuits 26. The deflection cricuits 26 develop the proper voltages and currents to deflect the electron beam of the kinescope in the desired manner. In general, the operation of a television receiver, as here described, is to be understood as merely illustrative and other arrangements of the operating units may be utilized, as is well known.

Referring now to the synchronizing signal separator circuit 24, video output signals from the video amplifier 16 are developed across a sectionalized voltage divider comprising three series sections provided by resistors 32, 34, and 36 connected in series between the output circuit 31 of the video amplifier 16 and a point of reference potential or ground for the receiver system. Video signals from the voltage divider are applied to the input or base electrode 38 of a synchronizing signal separator transistor 40, here illustrated as a PNP junction transistor, through the parallel combination of a resistor 92 and a compensating capacitor 44. The compensating capacitor 44 improves the rise time of the response of the transistor 40. Energizing current is supplied to the transistor 40 from a suitable source of current, here illustrated as a battery 46 having its positive terminal connected to the emitter electrode 48 of the transistor 40 through an emitter self-bias resistor 50, and having its negative terminal connected to ground as indicated. An output load resistor 52 is connected between the collector or output electrode 54 and ground, and separated synchronizing signals are applied to the vertical and horizontal deflection circuits 26 from across the load resistor 52.

In accordance with the invention, the bias of the base electrode 38 of the transistor 40 is also controlled by connecting this electrode in the output circuit of a second or control transistor 56 of a conductivity type opposite to that of the first transistor 40, that is, an NPN junction transistor in this case. This is accomplished by connecting the base electrode 38 of the first transistor 40 to the junction of a pair of resistors 58 and 60 serially connected between the positive terminal of the bias source 46 and the collector electrode 62 of the second or control transistor 56. The collector electrode 62 of the second transistor is by-passed to ground by a capacitor 68 for the video signal to prevent degeneration of the input signal to the first transistor 40.

It will thus be seen that the bias voltage appearing in the base electrode 38 of the synchronizing signal separator transistor 40 will be partially dependent upon the current flowing in the collector 62 of the control transistor 56, and a self bias voltage developed by current in the emitter resistor 50. Video signal input current for the control transistor 56 is obtained from the voltage divider by connecting the base electrode 70 to a variable tap 72 on the resistor 36.

In operation, the video output signal from the video amplifier, containing positive-going synchronizing pulses, is developed across the voltage divider and applied to the base electrode 38 of the signal separator transistor 40. The potential at the base electrode is initially adjusted by varying the tap 72 on the resistor 36 so that essentially zero voltage exists between the collector electrode 54 and the base electrode 38 of the signal separator transistor 40 at the black level of the video signal thereby causing a heavy collector current to flow. During the time of the synchronizing pulse interval the potential on the base electrode 38 goes positive causing reduced conduction in the transistor 40 and providing a negative output at the collector electrode 54. At higher levels of the synchronizing pulse the base is driven sufficiently positive to cut off the collector current flow of the signal separator transistor 40, thus cutting off the positive peaks of the synchronizing pulse.

During the video interval the base electrode 38 tends to go more negative, but since the collector electrode 54 is essentially at zero voltage with respect to the base electrode 38, a further increase in a negative direction will not result in a substantial increase in collector current. Since the collector-to-base voltage tends to bias the collector-base junction in the forward direction, transistor action no longer results and any increase in collector current is limited by the relatively large value of the load resistor 52.

However, if the amplitude of the received video signal changes, the clipping level may shift. A decrease in the level of the video signal will cause a decrease in self bias, and, conversely, an increase in video signal level causes an increase in self bias. Such changes in bias level may be sufficient to cause translation through the circuit of unwanted portions of the video signal when the total video signal is increased, and to cause incomplete cut off of the output current with decreased video signal. However, the action of the control transistor 56 causes the bias level on the base electrode 38 of the signal separator transistor 40 to be varied in accordance with the strength of the received video signal to maintain the proper clipping and cut off conditions.

Assume that a decreased video signal applied to the voltage divider comprising the series resistors 32, 34, and 36. The decreased signal will thus be applied to the base electrode 38 of the signal separator transistor 40, and the self bias on the base electrode 38 will thus be decreased. However, it may change or decrease by too great an amount and the clipping level at the black lever of the video signal may not be maintained. To provide a proper level of bias for the transistor 40 the decreased video signal is also applied at the base electrode 70 of the control transistor 56, which causes a decreased collector current flow therein. The decreased collector current causes a decreased voltage drop in the bias resistors 58 and 60. Since the drop across the resistor 60 is less, the bias voltage applied to the base electrode 38 of the signal separator transistor 40 from the battery 46 is thus increased, tending to maintain the bias on the base electrode 38 at the proper level.

Although an alternating video signal is applied to the base electrode 70 of the control transistor 56, the capacitor 68 connected between the collector 62 and ground bypasses the alternating current components of the video signal, so that the voltage at the junction of the resistors 58 and 60 is a substantially steady unidirectional voltage having a value proportional to the average D.-C. value of the applied video signal.

With the above described action the circuit maintains the level at which the collector current flow of the signal separator transistor 40 begins to be reduced by the applied synchronizing signal at the percentage of the peak video signal that is at slightly above the black level of the video signal. This also insures that with any reasonable video signal strength the synchronizing pulse will go sufficiently positive to cut off collector current flow completely in the transistor 40.

The opposite action will occur as the strength of the video signal is increased. Thus when the video signal is increased the self-bias of the transistor 40 is increased. However, the signal applied to the base electrode 70 of the control transistor 56 is also increased, or made more positive, causing an increased conduction therethrough, which will, in turn, increase the voltage drop across the voltage divider resistors 58 and 60 and will decrease, or make more negative, the self-bias on the base electrode 38 of the signal separator transistor 40 supplied by the battery 46.

The absolute voltage value of the synchronizing pulse will, of course, vary substantially with the strength of the received video signal, however, the difference between the clipping and cut-off voltages of the signal separator transistor 40 will not vary appreciably with the bias on the base electrode 38. Therefore, if the clipping level for the signal separator transistor 40 is maintained at the black level of the video signal, the peaks of the synchronizing pulses will be cut off or clipped at substantially all signal levels. Such action will provide a substantially constant voltage swing for the output synchronizing pulse appearing at the collector electrode 54 of the signal separator transistor 40.

The degeneration provided by an unbypassed resistor 66 connected to the emitter electrode 64 of the control transistor 56 renders the circuit operation substantially independent of the variation in transistor characteristics of the control transistor 56.

The circuit has been described and illustrated herein utilizing an N type transistor as the signal separating transistor 40 and a P type transistor as the control transistor 56. However, it is obvious that a P type transistor may be used as the signal separating transistor 40 and an N type as the control transistor 56 if the video signal is reversed and supplied to the circuit as a negative going signal with an accompanying polarity reversal of the energizing current sources.

In accordance with the invention a simple and dependable signal amplitude discriminatory circuit for translating a predetermined range of signal information from an applied signal is provided with positive control of the clipping and cut off levels and substantially constant output voltage excursion under conditions of variable signal input strength. The invention is thus adapted for use in synchronizing signal separator circuits for television receivers to great advantage.

What is claimed is:

1. In a signal receiving system an amplitude discriminatory signal circuit for translating a predetermined range of signal information from an applied signal comprising, a first semi-conductor device having an input and an output electrode, means for applying an input signal to the input electrode of said first device, circuit means including a second semi-conductor device of a conductivity type opposite to said first device direct-current conductively connected in circuit with said first device to provide control bias output current for biasing said first device operative to separate and translate said predetermined range of signal information from said applied input signal, and circuit means connected for applying said input signal to said second device to control the output current thereof and the bias of said first device inversely in accordance with the strength of said signal.

2. In a television signal receiving system, an amplitude discriminatory signal circuit for translating a predetermined range of signal information from an applied signal comprising, a signal translating semi-conductor device having input and output electrodes, signal translating circuit means connected with the input and output electrodes of said device, self bias means for said device connected in circuit therewith, signal responsive bias means including a second semi-conductor device of a conductivity type opposite to said first named device connected in circuit with the input electrode of said first named device for rendering said device operative to separate said signal information from an applied signal through said signal translating circuit means, and means for applying said signal to said second device to vary the bias of said first device in response to signal strength variation.

3. An amplitude discriminatory signal translating circuit comprising in combination, a first semi-conductor signal translating device having input and output electrodes, circuit means connected for applying an alternating current input signal to the input electrode of said device, signal output circuit means connected with said output electrode, bias means connected with said device for rendering said device operative to translate an input signal applied thereto above a predetermined signal level, means including a second semi-conductor device of an opposite conductivity type having an output electrode connected with the input electrode of said first device for varying the bias on said first device in response to changes in amplitude of said input signal to maintain the translating level of said first device at a substantially constant percentage of the peak value of said signal, and circuit means connected with said second device for applying a portion of said input signal thereto whereby it is responsive to said signal amplitude changes.

4. A signal translating circuit as defined in claim 3, wherein the semi-conductor devices are connected for base input and collector output signal translation.

5. An amplitude discriminatory signal translating circuit comprising, a transistor signal translating device having input, output, and common electrodes, circuit means for applying alternating current signals to the input electrode of said device, means connected in circuit with said input and common electrodes for biasing said transistor to translate alternating current signals above a predetermined signal level, means including a second transistor device of a conductivity type opposite to said first device and output resistor means therefore connected with said biasing means for varying the bias of said first device in response to changes in signal amplitude to maintain the predetermined translating level of said first device constant relative to the peak value of said signals, and circuit means connected with said second semi-conductor device for applying said alternating current signal thereto.

6. A signal separator circuit for translating a predetermined range of signal information from an applied alternating current signal, comprising in combination, a first transistor having base, emitter and collector electrodes; means for applying signals between said base and emitter electrodes; means providing a source of energizing potential and a self bias resistor connected serially in circuit with the emitter electrode of said first transistor; a second transistor of an opposite conductivity type to said first transistor having base, emitter and collector electrodes; a pair of resistors connected in series with the collector-to-emitter path of said second transistor through said source of energizing potential; means providing a connection for the base electrode of said first transistor to the junction of said pair of resistors; and means for applying said signals to the base electrode of said second transistor for varying the current through the collector-emitter path thereof and the bias on the base electrode of said first transistor inversely in response to changes in signal amplitude.

7. In a television receiver a synchronizing signal separator circuit for translating the synchronizing information from an applied composite video television signal, comprising in combination, a first transistor having base, emitter and collector electrodes; means for applying an input signal to said base electrode; means providing a source of energizing potential connected with said collector and emitter electrodes; means providing a self bias resistor connected to the emitter electrode of said first transistor; a second transistor of an opposite conductivity type to said first transistor having base, emitter and collector electrodes; a pair of resistors connected in series with the collector to emitter path of said second transistor; means for connecting said second transistor and said pair of resistors in parallel with said source of potential; means connecting the base electrode of said first transistor to the junction of said pair of resistors to bias said transistor to cause substantially constant collector current flow at all signal levels below a predetermined minimum level and to cause said collector current to be cut off at all signal levels above a predetermined maximum level; and means for applying a portion of the input signal to the base electrode of said second transistor for varying the collector current thereof in response to changes in amplitude of said received signal whereby the bias on the base electrode of said first transistor is varied inversely in accordance with the strength of said received signal, and said predetermined minimum and maximum levels remain at a substantially constant percentage of the peak value of said signal despite amplitude variations of said video signal level.

8. In a television receiver, a synchronizing signal separator circuit for translating the synchronizing information from an applied composite television video signal, comprising in combination, a first transistor having an input and an output circuit connected therewith; means for applying a composite television video signal to the input circuit of said first transistor; bias circuit means for said first transistor including a second transistor of an opposite conductivity type to said first transistor having an input and an output circuit associated therewith, operative to cause a substantially constant collector current flow at video signal levels below a predetermined minimum threshold level and collector current cutoff at video signal levels above a predetermined maximum level, and means for applying a portion of said video signal to the input circuit of said second transistor for varying the current in the output circuit thereof in response to variations in the average amplitude of said video signal whereby the bias on said first transistor is varied to maintain said minimum threshold level constant relative to the peak value of said video signal.

9. In a synchronizing signal separator circuit for a television receiver for translating the synchronizing information from an applied composite television video signal, comprising in combination, a signal separating transistor having base, emitter and collector electrodes; means for applying a composite video signal between said base electrode and a signal ground for said circuit; means providing a source of potential connected between said emitter electrode and ground; a self bias resistor interposed between said emitter electrode and said source; a second transistor of an opposite conductivity type to said signal separating transistor having base, emitter and collector electrodes; a pair of serially connected resistors connected between the collector electrode of said second transistor and said source of potentials; means for connecting the emitter electrode of said second transistor to ground; means connecting the base electrode of said first transistor to the junction of said pair of resistors to provide an additional bias voltage therefor; said self bias resistor and said last named means being operative to provide a substantially constant collector current flow in said first transistor at all levels of input signal below a predetermined minimum level and to provide collector current cut off in said first transistor at input signal levels above a predetermined maximum; and means for applying a portion of said video signal between the base electrode of said second transistor and signal ground for varying the average current through said second transistor in response to variations in average amplitude of said video signal whereby the bias in the base electrode of said first transistor is varied in response to the strength of said video signal, and said predetermined minimum level is maintained at a relatively constant percentage of the maximum value of said video signal.

10. A synchronizing signal separator for television systems comprising in combination, a first semi-conductor device having a first, second, and third electrodes, means providing an input circuit connected between said first and second electrodes for a signal including recurrent synchronizing pulses, means providing an output circuit connected between said second and third electrodes for deriving the synchronizing components of said composite television signal, means biasing said semi-conductor device for conduction in response to signals across said input circuit having an amplitude less than that of said synchronizing pulses, and dynamic biasing means including a second semi-conductor device direct-current conductively connected with said first device for adjusting the bias of said first semi-conductor device inversely in accordance with the strength of said signal.

11. A synchronizing signal separator for television systems comprising in combination, a first semi-conductor device having a first, second, and third electrodes, means providing an input circuit connected between said first and second electrodes for a signal including recurrent synchronizing pulses, means providing an output circuit connected between said second and third electrodes for deriving the synchronizing components of said composite television signal, means biasing said semi-conductor device for conduction in response to signals across said input circuit having an amplitude less than that of said synchronizing pulses, and for a condition of cut-off in response to a predetermined peak synchronizing pulse amplitude, and dynamic biasing means including a second semi-conductor device of a conductivity type opposite to that of said first semi-conductor device for adjusting the bias of said first semi-conductor device inversely in accordance with the strength of said signal.

References Cited in the file of this patent

UNITED STATES PATENTS

| | | |
|---|---|---|
| 2,508,923 | Mautner | May 23, 1950 |
| 2,736,765 | Lohman | Feb. 28, 1956 |
| 2,820,845 | Kabell | Jan. 21, 1958 |